US006222517B1

(12) United States Patent
Iba et al.

(10) Patent No.: US 6,222,517 B1
(45) Date of Patent: Apr. 24, 2001

(54) LIQUID CRYSTAL APPARATUS

(75) Inventors: Jun Iba, Yokohama; Akira Tsuboyama, Sagamihara; Yutaka Inaba, Hino, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/119,661

(22) Filed: Jul. 21, 1998

(30) Foreign Application Priority Data

Jul. 23, 1997 (JP) .................................................. 9-211173

(51) Int. Cl.[7] .................................................. G02F 1/133

(52) U.S. Cl. ............................ 345/94; 345/104; 345/103; 345/208; 345/210

(58) Field of Search ............................. 345/94, 100, 103, 345/204, 208, 210; 348/792

(56) References Cited

U.S. PATENT DOCUMENTS

| | | | | |
|---|---|---|---|---|
| 4,367,924 | | 1/1983 | Clark et al. | 350/334 |
| 4,674,839 | | 6/1987 | Tsuboyama et al. | 350/334 |
| 4,697,887 | * | 10/1987 | Okada et al. | 345/96 |
| 4,738,515 | | 4/1988 | Okada et al. | 350/350 S |
| 4,778,260 | | 10/1988 | Okada et al. | 350/350 |
| 4,830,467 | | 5/1989 | Inoue et al. | 350/333 |
| 4,836,656 | | 6/1989 | Mouri et al. | 350/350 S |
| 4,838,652 | | 6/1989 | Inaba et al. | 350/331 R |
| 4,878,740 | | 11/1989 | Inaba et al. | 350/337 |
| 4,902,107 | | 2/1990 | Tsuboyama et al. | 350/350 |
| 4,925,277 | | 5/1990 | Inaba | 350/350 S |
| 4,930,875 | | 6/1990 | Inoue et al. | 350/333 |
| 4,932,759 | | 6/1990 | Toyono et al. | 350/350 S |
| 4,958,912 | | 9/1990 | Inaba et al. | 350/333 |
| 4,958,915 | | 9/1990 | Okada et al. | 350/345 |
| 5,026,144 | | 6/1991 | Taniguchi et al. | 350/350 S |
| 5,033,822 | | 7/1991 | Ooki et al. | 350/331 T |
| 5,034,735 | | 7/1991 | Inoue et al. | 340/784 |
| 5,041,821 | | 8/1991 | Onitsuka et al. | 340/784 |
| 5,058,994 | | 10/1991 | Mihara et al. | 359/56 |
| 5,091,784 | * | 2/1992 | Someya et al. | 348/589 |
| 5,132,818 | | 7/1992 | Mouri et al. | 359/56 |
| 5,136,282 | | 8/1992 | Inaba et al. | 340/784 |
| 5,262,881 | * | 11/1993 | Kuwata et al. | 345/94 |
| 5,267,065 | | 11/1993 | Taniguchi et al. | 359/56 |
| 5,298,914 | * | 3/1994 | Yamazaki | 345/103 |
| 5,321,419 | | 6/1994 | Katakura et al. | 345/97 |
| 5,469,281 | | 11/1995 | Katakura et al. | 359/56 |
| 5,471,229 | | 11/1995 | Okada et al. | 345/89 |
| 5,485,173 | | 1/1996 | Scheffer et al. | 345/100 |
| 5,506,601 | | 4/1996 | Mihara et al. | 345/103 |
| 5,508,716 | * | 4/1996 | Prince et al. | 345/103 |
| 5,519,411 | | 5/1996 | Okada et al. | 345/89 |
| 5,521,727 | | 5/1996 | Inaba et al. | 359/56 |
| 5,532,713 | | 7/1996 | Okada et al. | 345/97 |

(List continued on next page.)

FOREIGN PATENT DOCUMENTS

| | | |
|---|---|---|
| 56-107216 | 8/1981 | (JP) . |
| 63-155032 | 6/1988 | (JP) . |
| 5-100642 | 4/1993 | (JP) . |

*Primary Examiner*—Bipin Shalwala
*Assistant Examiner*—Vincent E. Kovalick
(74) *Attorney, Agent, or Firm*—Fitzpatrick, Cella, Harper & Scinto

(57) ABSTRACT

A liquid crystal device having a matrix of pixels formed at intersections of scanning electrodes and data electrodes with e.g., a chiral smectic liquid crystal having at least two stable states, is driven at a high speed by simultaneously selecting M scanning electrodes (M being an integer of at least 2), and applying scanning signals to the simultaneously selected scanning electrodes and data signal to the data electrodes so as to apply writing pulses for determining states of pixels to pixels at the intersections of the selected scanning electrodes and the data electrodes and so that each pixel on the selected scanning electrodes is supplied with writing pulse(s) of a writing polarity having a time-integrated voltage value which is larger than that of writing pulse(s) of an anti-writing polarity, if any.

15 Claims, 12 Drawing Sheets

U.S. PATENT DOCUMENTS

| | | | | |
|---|---|---|---|---|
| 5,583,534 | | 12/1996 | Katakura et al. | 345/97 |
| 5,592,190 | | 1/1997 | Okada et al. | 345/89 |
| 5,592,191 | | 1/1997 | Tsuboyama et al. | 345/97 |
| 5,598,299 | | 1/1997 | Hayakawa | 359/557 |
| 5,602,562 | | 2/1997 | Onitsuka et al. | 345/101 |
| 5,606,343 | | 2/1997 | Tsuboyama et al. | 345/97 |
| 5,627,559 | | 5/1997 | Tsuboyama et al. | 345/97 |
| 5,638,195 | | 6/1997 | Katakura et al. | 349/143 |
| 5,646,755 | | 7/1997 | Okada et al. | 345/97 |
| 5,657,038 | | 8/1997 | Okada et al. | 345/94 |
| 5,673,062 | | 9/1997 | Katakura et al. | 345/95 |
| 5,682,177 | * | 10/1997 | Kuwata et al. | 345/100 |
| 5,689,320 | | 11/1997 | Okada et al. | 349/135 |
| 5,691,740 | | 11/1997 | Onitsuka et al. | 345/96 |
| 5,717,421 | | 2/1998 | Katakura et al. | 345/101 |
| 5,734,367 | | 3/1998 | Tsuboyama et al. | 345/101 |
| 5,754,154 | | 5/1998 | Katakura et al. | 345/97 |
| 5,796,381 | | 8/1998 | Iwasaki et al. | 345/101 |
| 5,808,594 | | 9/1998 | Tsuboyama et al. | 345/89 |

* cited by examiner

LIQUID CRYSTAL APPARATUS

FIELD OF THE INVENTION AND RELATED ART

The present invention relates to a matrix-type liquid crystal apparatus, more particularly to a driving method for a liquid crystal apparatus using a liquid crystal device having two stable states.

Hitherto, there has been a liquid crystal display device comprising a liquid crystal cell formed of a pair of substrates including one having thereon a group of scanning electrodes and the other having thereon a group of data electrodes, and a liquid crystal material disposed between the electrodes so as to form a matrix of pixels for displaying picture data. Particularly, extensive research and development have been made on a ferroelectric liquid crystal device using a liquid crystal having a spontaneous polarization and capable of responding to electric fields applied thereto at high speeds to realize two stable liquid crystal molecular alignment states since the year of 1980, e.g., as disclosed in Japanese Laid-Open Patent Application (JP-A) 56-107216.

In various driving methods for ferroelectric liquid crystal devices proposed heretofore, scanning lines are selected one by one for writing. A set of drive signal waveforms used in a representative conventional drive scheme is shown in FIG. 16. In FIG. 16, at (A) is shown a scanning signal waveform at the time of selection; (B), a scanning signal waveform at the time of non-selection; (C), a data signal waveform for writing "white" (W) or a bright state; and (D), a data signal waveform for writing "black" (B) or a dark state. The drive signal waveform set is for a line-sequential writing scheme, wherein pixels on scanning lines are driven line by line, i.e., erased or reset into "black" by application of a V1 pulse as shown at FIG. 16(A), and then supplied selectively with either a pulse V3 at (C) or a pulse V4 at (D) to be written into "white" or to retain "black" without being written into "white" depending on the magnitude of a voltage difference with a V2 pulse at (A). In a specific example, the voltages may be set to satisfy V3=−V4=V5, V2=2.V4 and V1=V2, and the pulse widths may be set at ratios of V1:V2:V5:V4(C):V3(D):V3(C):V4(D)=5:2:1:1:1:2:2. The setting of more specific voltages and pulse widths may be varied depending on a cell gap between electrodes, a temperature and a liquid crystal material used in the device.

A ferroelectric liquid crystal device described above has a memory characteristic so that a black or a white display state can be sufficiently held even when an interval until a subsequent writing becomes long according to a lowering in frame frequency. Accordingly, a large panel having an increased number of scanning signal lines can be realized, but the image quality is inevitably lowered due to the lowering in frame frequency.

In order to provide an improvement to the above-mentioned problem, JP-A 63-155032 has proposed to scan a plurality of lines for realizing a high-speed drive. However, in the plural line scanning scheme described in JP-A 63-155032, each scanning signal is caused to have a pulse width of ½M in the case of scanning M lines at a time, and thus the pulse width becomes shorter corresponding to the number of scanning lines selected simultaneously, so that it is impossible to realize a substantially higher speed drive.

SUMMARY OF THE INVENTION

An object of the present invention is to provide a liquid crystal apparatus using a polarity-driven liquid crystal as represented by a ferroelectric liquid crystal and capable of realizing a high-speed drive and a large display area without causing a lowering in picture quality due to a lowering in frame frequency.

According to the present invention, there is provided a liquid crystal apparatus, comprising:

(A) a liquid crystal device comprising a group of scanning electrodes, a group of data electrodes intersecting the scanning electrodes, and a liquid crystal disposed so as to form a matrix of pixels each at an intersection of the scanning electrodes and the data electrodes, said liquid crystal having at least two stable states so as to be written into one stable state when supplied with a voltage of one polarity exceeding a threshold, and (B) drive means for driving the liquid crystal device by selectively applying scanning signals and data signals to the scanning electrodes and the data electrodes so as to selectively apply a combined voltage to each pixel; said drive means comprising means for:

simultaneously selecting M scanning electrodes (M being an integer of at least 2), and applying scanning signals to the simultaneously selected scanning electrodes and data signals to the data electrodes so as to apply writing pulses for determining states of pixels to pixels at the intersections of the selected scanning electrodes and the data electrodes and so that each pixel on the selected scanning electrodes is supplied with writing pulse(s) of a writing polarity having a time-integrated voltage value which is larger than that of writing pulse(s) of an anti-writing polarity, if any.

Herein, a time-integrated voltage value of a polarity of writing pulse(s) refers to a value determined by $\int_0^t V\,dt$ (wherein V is a voltage value in a writing or anti-writing polarity of writing pulse(s)) and is determined by $$\sum^{n} (Vn) \times (\Delta tn)$$

in the case of a plurality (n) of rectangular pulses in the writing or anti-writing polarity having voltage amplitudes V1, . . . Vn and pulse widths Δt, . . . Δn, respectively.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Figure 1A:
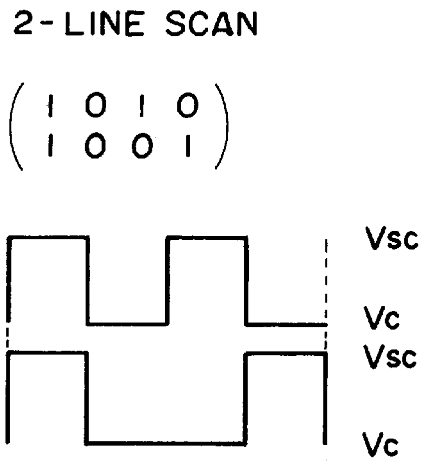
FIGS. 1A–1C each illustrate an example of scanning signal waveforms used in an embodiment of the invention.

In an embodiment of matrix drive according to the invention, M lines of scanning electrodes are selected simultaneously by using scanning signals having selection pulses all having a polarity for writing in the pixels, wherein M is a positive integer of at least 2.

The scanning signal in the selection period is composed of $2^M$ phases, and the scanning signals supplied to the M lines have mutually different M voltage patterns, which are different at the respective phases. Among $2^M$ voltage patterns based on data for the M lines, one is selected as a data signal. In a voltage pattern of a scanning signal, a phase having a selection pulse for determining a pixel writing state is denoted by "1", and a phase having no selection pulse is denoted by "0". On the other hand, as for display states of pixels on simultaneously selected M lines, a written state is denoted by "1" and a non-written state is denoted by "0". Then, the voltage levels at respective phases of each data signal are determined based on whether or not the display patterns (or display pattern digits) correspond to the voltage patterns (or voltage pattern digits) at the respective phases of the scanning signals for the M lines.

For example, the voltage level at a certain phase of each data signal is set to have a maximum voltage V1 of a polarity in writing direction (herein, sometimes called a writing polarity) when the voltage pattern digits at the phase of the scanning signals for M lines are fully identical to the display pattern digits for the M scanning lines; is set to have a maximum voltage of a polarity reverse to the writing polarity (herein, somtimes called a reverse polarity or an anti-writing polarity) when the voltage pattern digits at the phase are fully different from the display pattern digits for the M lines; and is set to have a voltage Vn which is intermediate between V1 and V2 when the voltage pattern digits are partially identical to the display pattern digits for the M lines.

In a specific case, the voltage values Vn for the data signals are all set to be zero, and the voltages of the data signals are set to satisfy V1=−V2.

Further, the scanning signals may be further set to include a reset pulse. In this case, a portion of the phases of each scanning signal may be composed of such a reset pulse.

Further, each scanning signal can be provided with an auxiliary pulse having a polarity different from that of a writing pulse immediately after the writing pulse.

The scanning signals and the data signals may be set to have a ratio (i.e., a bias ratio) of, e.g., 2-4, between a combined signal voltage (or a pixel voltage) obtained as a combination of a scanning signal and a data signal at the selection period and the voltage value of the data signal in a non-selection period.

The liquid crystal used in the present invention may preferably be a liquid crystal assuming at least two stable states, inclusive of a liquid crystal exhibiting a chiral smectic phase, such as a ferroelectric liquid crystal, and a bistable chiral nematic liquid crystal.

As described above, in the present invention, M lines of scanning electrodes are selected simultaneously and, among writing pulses determining the display state of a pixel applied during a selection period of a scanning signal, writing pulses having a polarity for writing in a pixel (i.e., a writing polarity) have a time-integrated value larger than that of writing pulses having an anti-writing polarity. As a result, M lines can be selected simultaneously in a selection period that is almost identical to a selection period for one line scanning, thereby allowing a high-speed drive.

Further, by using a reset pulse, pulses unnecessarily applied to a liquid crystal can be cancelled, thereby providing a larger drive margin.

Further, the drive margin can also be increased by cancelling pulses unnecessarily applied to the liquid crystal by applying an auxiliary pulse.

A further broad drive margin can be provided by using a liquid crystal having drive characteristics which are optimum for the present invention.

The drive scheme adopted in the present invention is utterly different from conventional drive schemes for TN devices or STN devices. This is explained below.

As a drive scheme for a liquid crystal device, there has been known a voltage-averaging method applied to TN devices and STN devices as mentioned above (Katsumi YOSHINO and Masanori OZAKI, "Ekisho Display no Ohyo to Kiso (Application and Basic of Liquid Crystal Display), published from Coronasha K.K., pp. 117–130). According to this scheme, effective values applied to a selection point, a half-selection point and a non-selection point are changed, thereby controlling an electric field intensity applied to liquid crystal molecules and liquid crystal alignment in the electric field. The liquid crystal in a TN device or STN device does not fully respond to a single selection pulse but gradually responds to repetition of several selection pulses applied thereto, that is based on a so-called cumulative response effect. Such a writing scheme is possible because the liquid crystal is driven based on a principle that the liquid crystal alignment change is caused so as to minimize the dielectric constant of liquid crystal molecules in an applied electric field. The drive voltage applied to the liquid crystal is proportional to the square of an electric field applied thereto and does not depend on the polarity of the electric field. Thus, the state change of the liquid crystal depends on the effective value of an applied electric field.

On the other hand, in a polarity drive scheme as applied to a ferroelectric liquid crystal device, etc., the switching is performed by applying a polarity of voltage exceeding a threshold of the liquid crystal at the time of scanning selection. This is an essential difference from the above-mentioned drive scheme for a TN device or an STN device. Accordingly, a scanning signal comprising a mixture of two polarity pulses can be used for a TN device at the time of selection, whereas a polarity-drive liquid crystal device requires a scanning signal principally comprising a writing polarity pulse and providing a writing polarity pulse at the time of selection to pixels on the selected scanning line.

The above-mentioned principle also holds true with an "active addressing drive method" for an STN device described in JP-A 5-100642. The "active addressing drive method" is a technique for alleviating a contrast lowering encountered in an STN device.

As the development of a higher-speed liquid crystal material (i.e., a low-viscosity material) for an STN device, it has become possible that the liquid crystal can respond to (the effective value of) a single selection pulse. More specifically, in conventional cases of using a liquid crystal having a slow response speed, an alignment change of liquid crystal is caused over several frame periods depending on the effective value of an applied voltage whereas, if response time is shortened to a period comparable to one frame period, the liquid crystal molecules are caused to response to (i.e., cause alignment change in response to) each applied pulse. Such a phenomenon is generally called a "frame response phenomenon". Under such a response condition, the transmittance difference between the on and off states is reduced to result in a lower contrast.

If the "active addressing drive method" is applied to a liquid crystal having a quick responsiveness as to cause the frame response phenomenon, scanning signals for several lines and data signals are correlated with each other to exhibit an effect similar to the use of higher frequency signals, thus suppressing the "frame response phenomenon" to provide an improved contrast. Thus, the "active addressing drive method" does not result in a shorter scanning period and is therefore different from the drive method of the present invention as will be further discussed below.

In the TN or STN device, the liquid crystal does not respond to the applied electric field within one scanning selection period but causes a response still based on the "cumulative response effect". On the other hand, according to a drive principle adopted in a ferroelectric liquid crystal device, the writing at a liquid crystal pixel is completed within a single scanning period and the voltage effective value applied to the liquid crystal within a subsequent non-selection period much longer than the scanning selection period does not relate to the response of the ferroelectric liquid crystal. The writing period depends on whether a time-integrated value of applied polarity voltage exceeds a threshold thereof, and the switching direction of the liquid crystal is also governed by the polarity of the voltage.

Next, drive waveforms used in the present invention will be discussed.

Figure 1B:
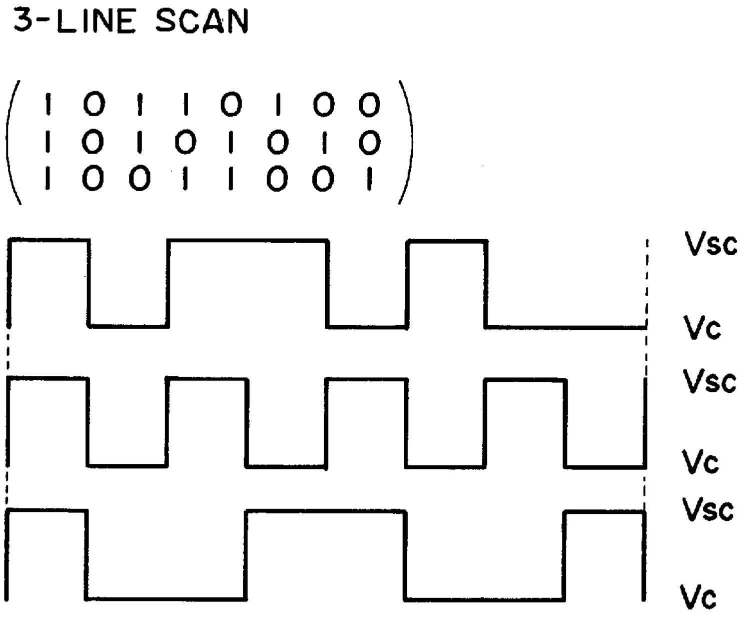
Figure 1C:
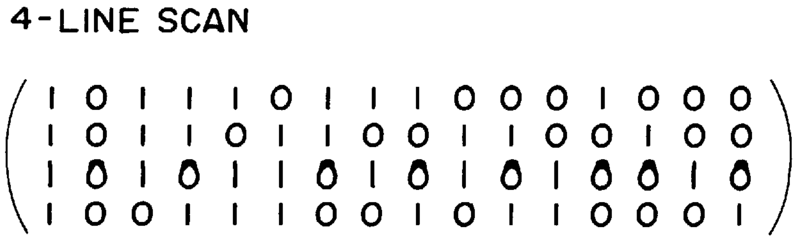

As for combination of a selection pulse phase (i.e., a phase causing a selection pulse) and a non-selection pulse phase (i.e., a phase causing no selection pulse), several combinations are possible depending on the number of scanning line selected simultaneously. Thus, $2^2=4$ combinations are possible in 2-line simultaneous scanning; $2^3=8$ combinations, in 3-line simultaneous scanning; and $2^4=16$ combinations, in 4-line simultaneous scanning. FIGS. 1A–1C show examples of scanning signals corresponding to such combinations. More specifically, FIG. 1A shows a pulse waveform example together with its matrix expression in the case of 2-line simultaneous scanning; FIG. 1B shows a pulse waveform example together with its matrix expression in the case of 3-line simultaneous scanning; and FIG. 1C shows a matrix expression of scanning pulses in the case of 4-line simultaneous scanning. In the matrix expression, a selection pulse phase is denoted by "1", and a non-selection pulse phase is denoted by "0". In the scanning signal waveforms, Vsc represents a selection pulse voltage, and Vc represents a reference voltage.

Next, as for combinations of data signals, $2^2=4$ combinations are possible in 2-line simultaneous scanning, $2^3=8$ combinations are possible in 3-line simultaneous scanning, and $2^4=16$ combinations are possible in 4-line simultaneous scanning, respectively depending on display patterns (or display pattern digits). Taking the case of 2-line simultaneous scanning, display patterns of (11), (00), (10) and (01) and corresponding data signals are possible, wherein "1" denotes a white display state, and "0" denotes a black display state.

Figure 2A:
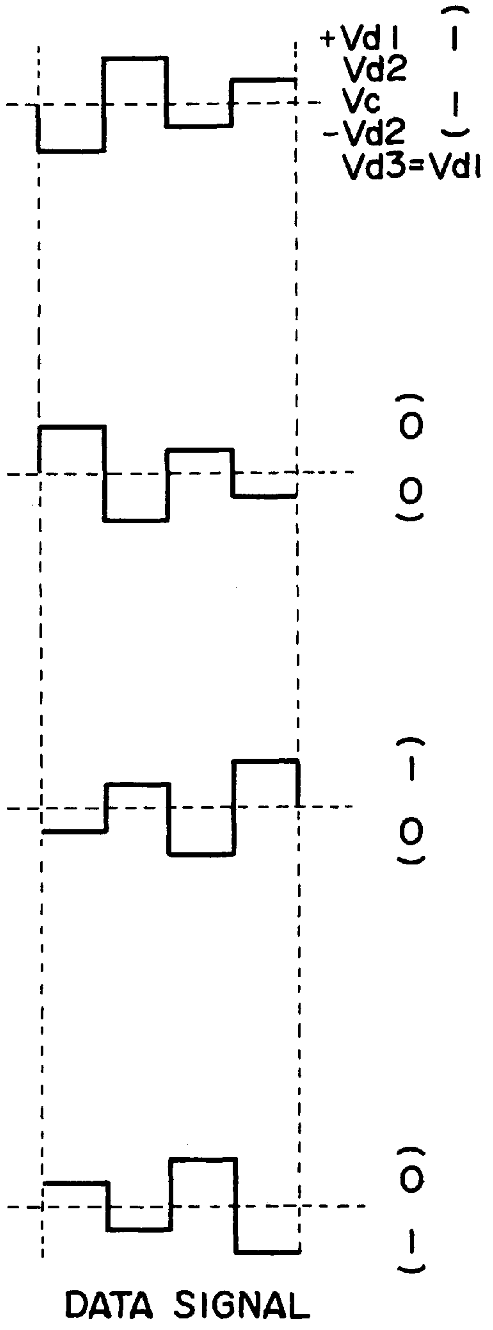
FIGS. 2A and 2B illustrate a set of data signals and a set of pixel signals used in an embodiment of the invention.

The voltage level of each phase of a data signal is determined depending on the number of coincidence of the display pattern digit (1 or 0) and the voltage pattern digit (1 or 0), e.g., as shown in FIG. 2A for the case of 2-line simultaneous scanning shown in FIG. 1A.

For example, in the case of display pattern (11) represented by an uppermost pattern in FIG. 2A, at a first phase showing voltage pattern digits (11) (indicated vertically in FIG. 1A), the voltage pattern digits (11) both coincide with the display pattern digit (1). At third and fourth phases showing voltage pattern digits (10) and (01) respectively, one voltage pattern digit coincides with the display pattern digit (1). Finally, at a second phase showing voltage pattern digits (00), no voltage pattern digits coincide with the display pattern digit (1). Accordingly, the voltage levels of the respective phases of the uppermost data signal pattern in FIG. 2A are set to be −Vd1 (i.e., a maximum level of a writing polarity (opposite to the writing polarity of a selection pulse voltage Vsc in the scanning signal) at the first phase (11), +Vd1 (i.e., a maximum level of an anti-writing polarity (identical to the writing polarity of a selection pulse voltage Vsc) at the second phase (00), and Vd2 at the third phase (10) and the fourth phase (01). Thus, Vd3 (=−Vd1) having a maximum voltage level of a writing polarity is given for the maximum degree of coincidence (two) at the first phase; +Vd1 having a maximum voltage level of an anti-writing polarity is given for the minimum degree of coincidence (zero) at the second phase; and ±Vd2 having an intermediate voltage level between Vd1 and Vd2 (=−Vd1) and having mutually opposite polarities are given for medium levels of coincidence (one) at the third phase (10) and the fourth phase (01). In the display signal shown in FIG. 2A, the voltage levels may be set to satisfy Vd3=−Vd1, and Vd2=Vd1/2. Further, in the 2-line simultaneous scanning of this embodiment, Vsc is set to satisfy Vsc=2Vd1. In view of the drive signal characteristic of such a ferroelectric liquid crystal device, data signals are required to DC-compensated within a period of one to several horizontal scanning periods (one to several H). For this reason, the intermediate level voltage is separated into ±Vd2 for the third and fourth phases.

The voltage levels of second to fourth data signals from the top to the bottom in FIG. 2A represented by display pattern digits (00), (10) and (01), respectively, are determined in similar manners as explained above and set to be as shown therein.

Figure 2B:
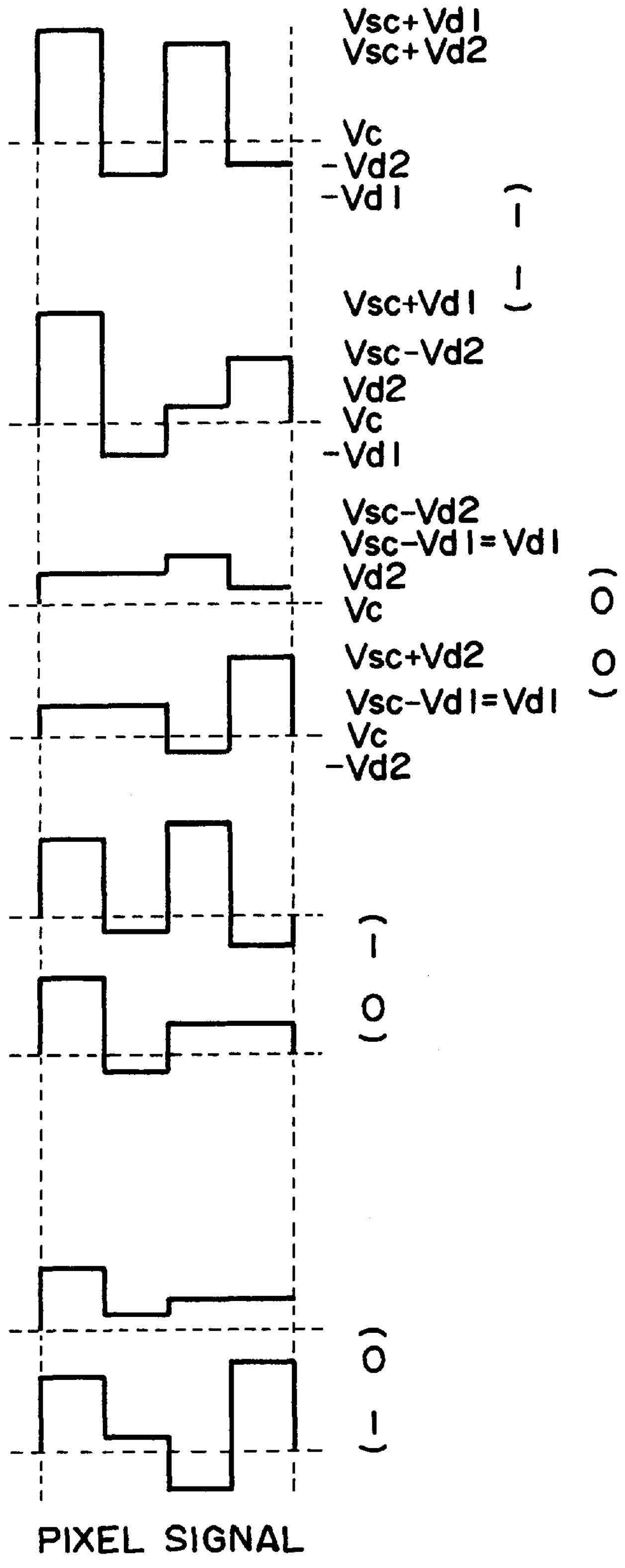

Further, the combined signals (i.e., pixel signals) for 8 pixels obtained by combination of two scanning signals shown in FIG. 1A and four data signals shown in FIG. 2A are shown in FIG. 2B.

Hereinbelow, some embodiments of the present invention will be described with reference to drawings.

[First Embodiment]

Figure 3:
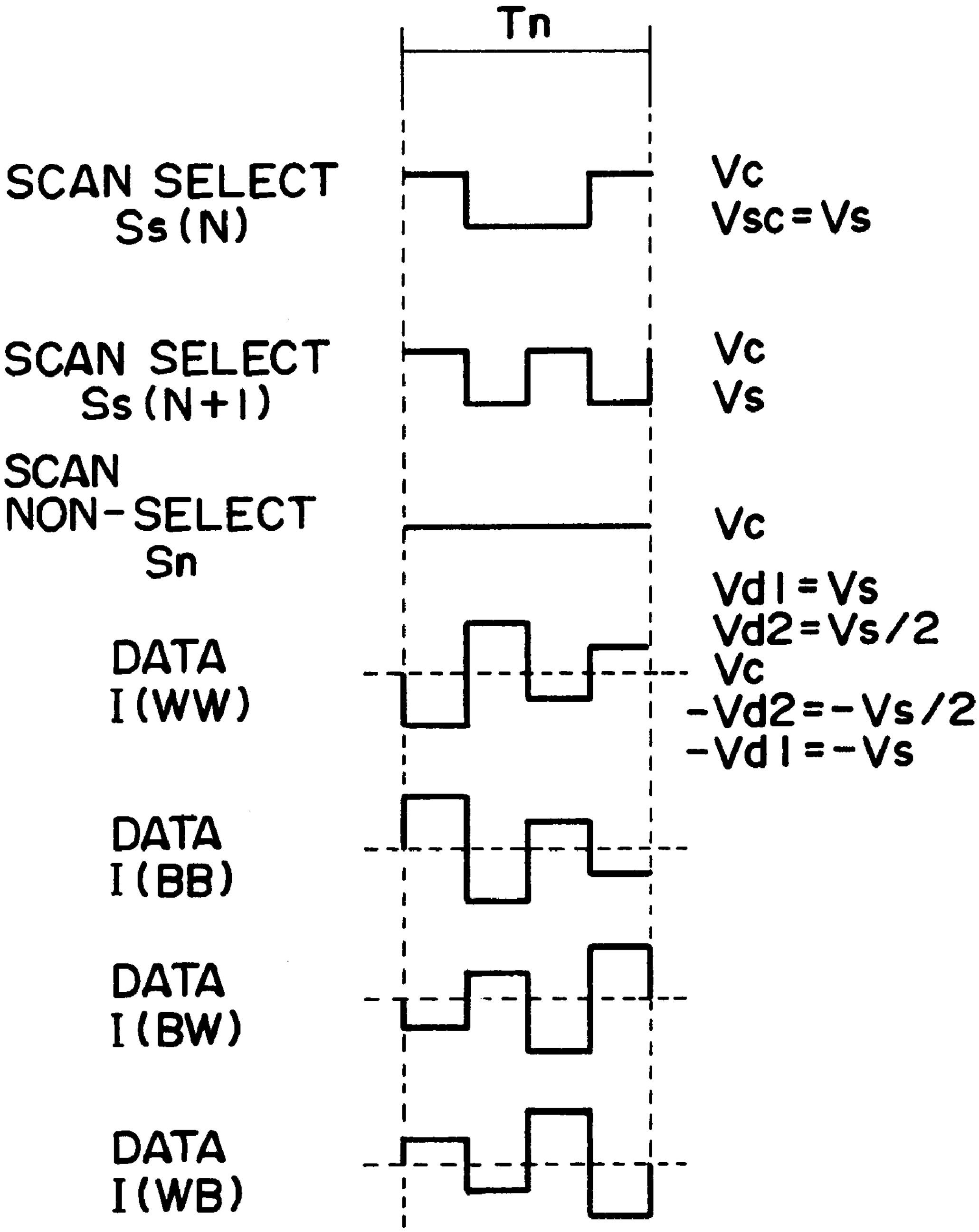
FIG. 3 illustrates a set of drive signals for a first embodiment of the liquid crystal apparatus according to the invention.
Figure 4:
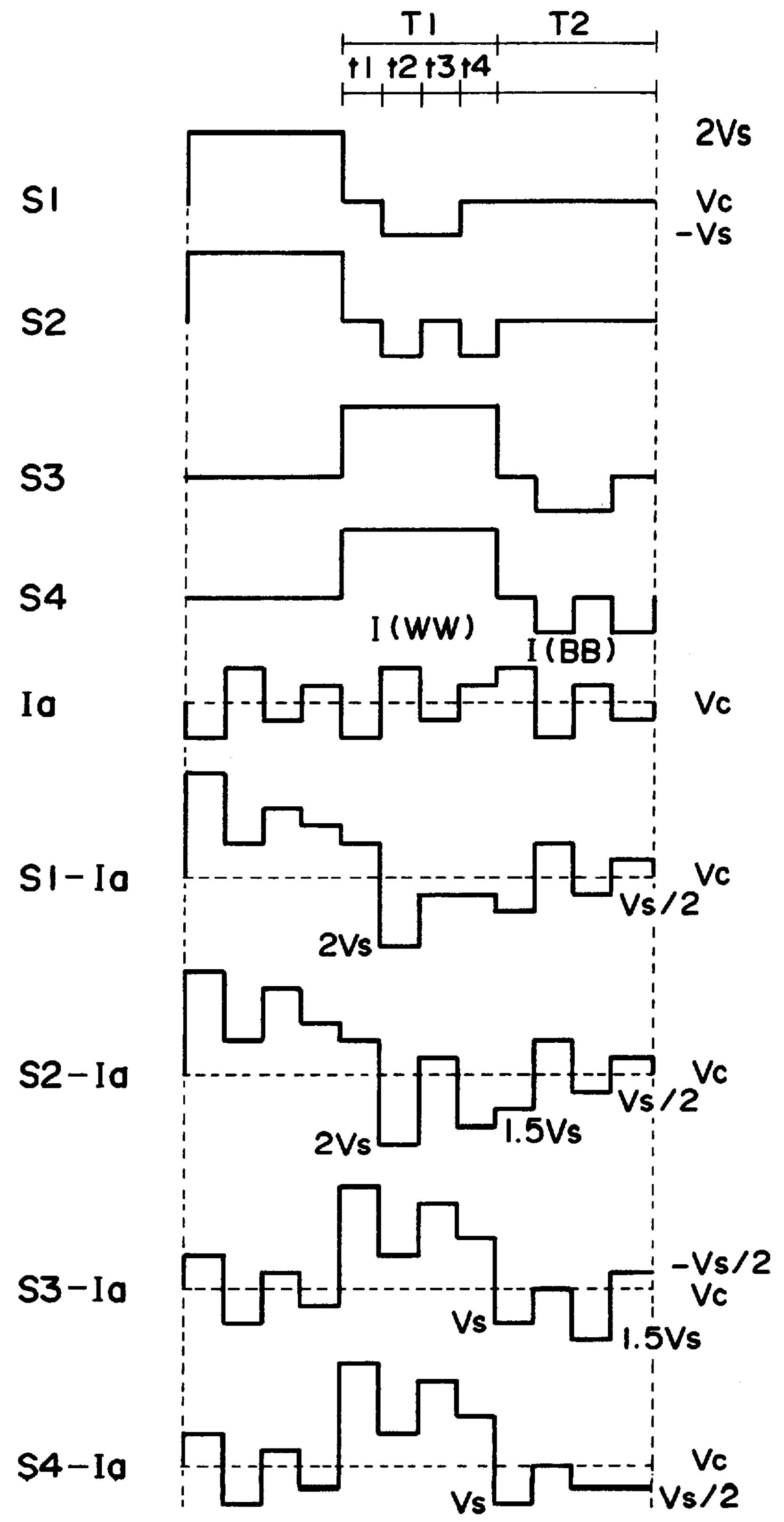
FIG. 4 illustrates time-serially applied drive signals for the first embodiment.

FIGS. 3 and 4 show drive signals singly and in succession used in this embodiment of the liquid crystal apparatus.

Referring to FIG. 3, Ss (N) represents a scanning selection signal applied to an N-th scanning electrode, and Ss(N+1) represents a scanning selection signal applied to an N+1-th scanning electrode, respectively, addressed at an address period Tn (n=1, 2, . . . n), and Sn represents a scanning non-selection signal applied to scanning electrodes not addressed at the address period Tn.

On the other hand, I(WW), I(BB), I(BW) and I(WB) represent data signals selectively applied to data electrodes for displaying W(white)-W, B(black)-B, B-W and W-B, respectively, at two pixels on two selected two scanning lines. Thus, at the address period Tn, any one of the four data signals is applied to each data line. Incidentally, a scanning signal voltage is set to Vsc=Vs, and data signal voltages are set to Vd1=Vs and Vd2=Vs/2.

Figure 5:
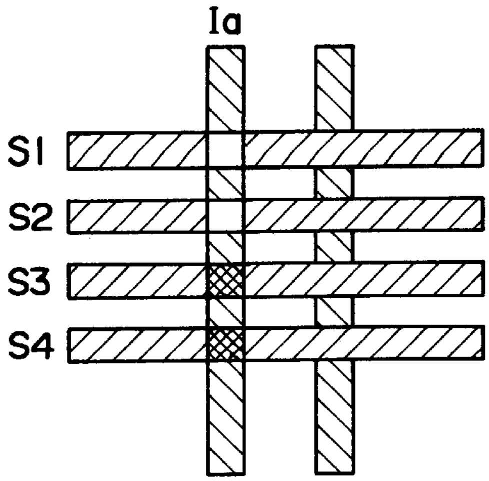
FIG. 5 illustrates a driven state of pixels according to the first embodiment.

FIG. 4 is a time-serial voltage waveform showing a state where drive voltages shown in FIG. 3 are applied in succession to provide a display pattern shown in FIG. 5 at intersections (pixels) of scanning electrodes S1–S4 and a data electrode Ia. Referring to FIG. 4, at an address period T1, a first scanning electrode S1 and a second scanning electrode S2 are simultaneously addressed by applying thereto scanning signals Ss(N) and Ss(N+1), respectively shown in FIG. 3. Further, at an address period T2, a third scanning electrode S3 and a fourth scanning electrode S4 are simultaneously addressed by applying thereto the scanning signals Ss(N) and Ss(N+1), respectively, shown in FIG. 3. Before each address period Tn, a reset or clearing pulse having a pulse width of period Tn−1 and a pulse voltage 2Vs is applied-so as to provide a black display state as a reset state.

In this embodiment, pixels on scanning electrodes S1 and S2 intersecting with a data electrode Ia are respectively driven to display "white" and accordingly are supplied with a data signal I(WW) at an address period T1, and pixels on scanning electrodes S3 and S4 for respectively displaying "black" are supplied with a data signal I(BB) at an address period T2.

As a result, the respective intersections (pixels) are supplied with combined signals as shown at S1-Ia, S2-Ia, S3-Ia and S4-Ia, respectively. Corresponding thereto, in a selection period T1 for the scanning electrode S1 for "white" display, the pixel (S1-Ia) is supplied with 2Vs at phase t2 and Vs/2 at phases t3 and t4, and in the selection period T1 for the scanning electrode S2, the pixel (S2-Ia) is supplied with 2Vs at phase t2, −Vs/2 at phase t3 and 1.5Vs at phase t4. On the other hand, for "black" display, in a selection period T2 for the scanning electrode S3, the pixel (S3-Ia) is supplied with Vs at phase t1, 1.5Vs at phase t3 and −Vs/2 at phase t4, and in the selection period T2 for the scanning electrode S4, the pixel (S4-Ia) is supplied with Vs at phase t1 and Vs/2 at phases t3 and t4. Accordingly, a pixel in the "white" display-selection period is supplied with a time-integrated voltage (or a product of voltage and pulse width) of 2Vs+Vs/2+Vs/2 (or 2Vs−Vs/2+1.5Vs) (=3Vs), if a time width for each of phases t1, t2, t3 and t4 is taken at 1, and a white-writing polarity is taken as positive. On the other hand, a pixel in the "black" display-selection period is supplied with a time-integrated voltage of Vs+1.5Vs−Vs/2 (or Vs+Vs/2+Vs/2) (=2Vs). Accordingly, if a threshold voltage Vth of the liquid crystal is set to satisfy: 2Vs<Vth<3Vs, the pixels can be selectively written into either "white" or "black" within their associated selection periods.

Figure 6:
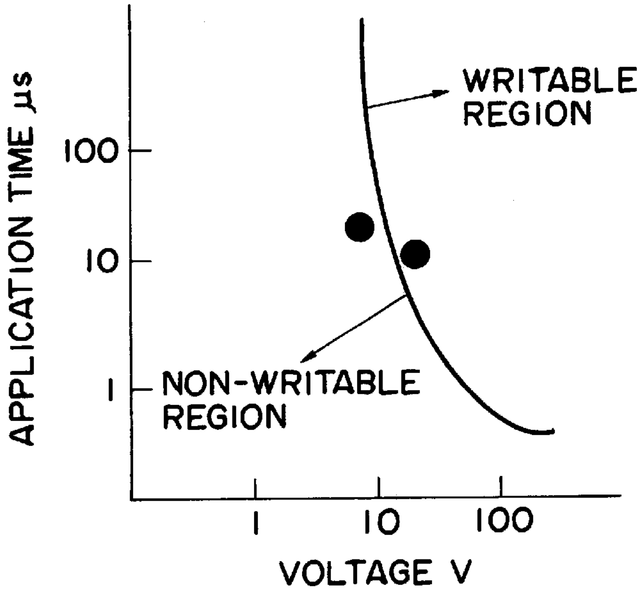
FIG. 6 is a graph showing an example of drive characteristic of a liquid crystal for the first embodiment.

Now, an application time-dependence of threshold voltage of a liquid crystal as used in this embodiment is shown in FIG. 6. FIG. 6 shows a writable region wherein a pixel can be written into "white" after resetting to "black", and a non-writable region wherein a pixel cannot be written into "white" but retains "black" after resetting to "black". While a liquid crystal assuming a chiral smectic phase, such as a ferroelectric liquid crystal, generally shows a threshold value that is constant for a constant product of voltage x time, the threshold of the liquid crystal used in this embodiment shown in FIG. 6 is affected more by applied voltage than application time. Accordingly, even if the product of applied voltage (V) and applied time (t) (=V×t) is constant, a lower threshold is given at a higher applied voltage. This characteristic facilitates designing of a white and a black writing waveform based on a difference in applied voltage and is suitable for a drive mode wherein different voltage values are used for "black" writing and "white" writing.

The threshold characteristic shown in FIG. 6 may be represented by a formula of:

$$|\log_{10}\Delta t1-\log_{10}\Delta t2|/|\log_{10}V1-\log_{10}V2|>1,$$

wherein a first threshold is denoted by a voltage V1 and a time Δt1, and a second threshold is denoted by a voltage V2 and a time Δt2. In this embodiment, Vs may be set within a range of 1–30 volts, and phases t1–t4 may respectively be set to have a duration of 1–50 μsec.

In this embodiment, the scanning signal voltage Vsc and data signal voltage Vd are set to satisfy Vsc=Vd=Vs, but it is possible to set, e.g., Vsc=2Vd, or Vsc=3Vd. It is generally preferred to adopt a range of Vd≦Vsc≦3Vd.

Figure 7:
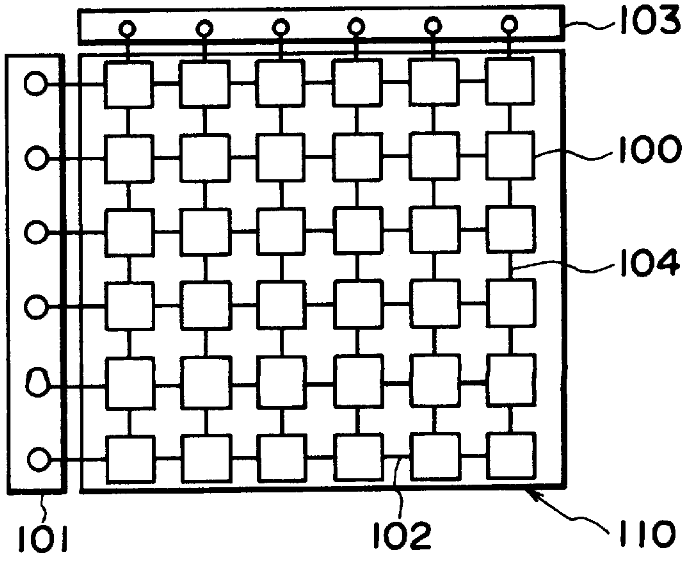
FIG. 7 is a plan view for illustrating a panel arrangement in the first embodiment of the liquid crystal apparatus according to the invention.

FIG. 7 is a schematic plan view for illustrating a liquid crystal panel structure included in this embodiment of the liquid crystal display apparatus according to the present invention. Referring to FIG. 7, the liquid crystal panel structure includes a liquid crystal panel 110 formed of a group of scanning electrodes 102 and a group of data electrodes 104 so as to form a matrix of pixels each at an intersection of the scanning electrodes and data electrodes for displaying a bit of picture data, a scanning electrode driver 101 for sequentially selecting the scanning electrodes and supplying drive waveforms to the selected scanning electrodes at prescribed time, and a data electrode driver 103 for supplying prescribed drive waveforms to the data electrodes 104 at prescribed time depending on video input signals. The pixels arranged in a matrix are supplied with video data through the data electrodes 104 for writing on the scanning electrodes 102 sequentially selected by scanning signals supplied through the scanning electrodes.

Figure 8:
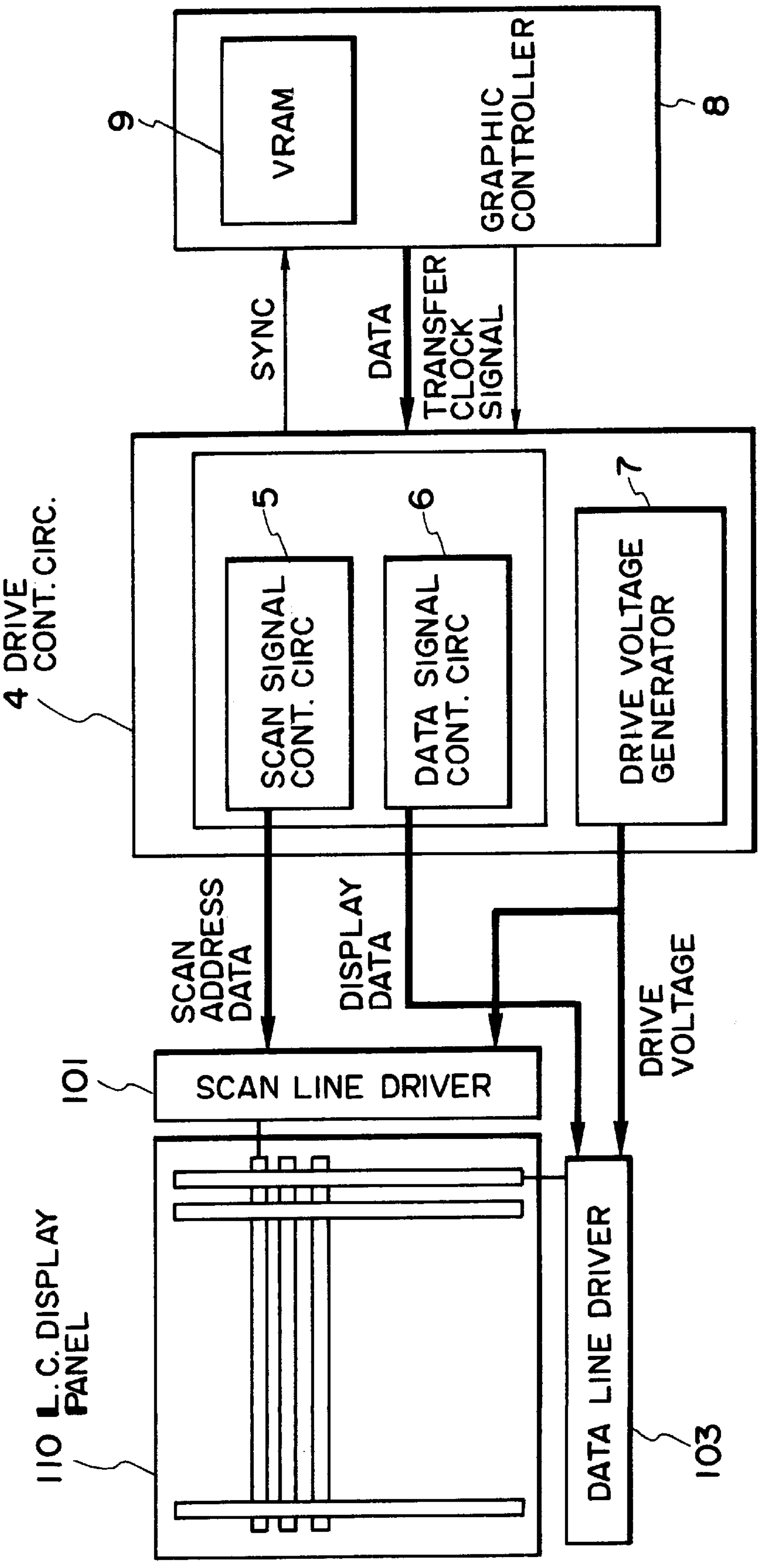
FIG. 8 is a block diagram of the first embodiment of the liquid crystal apparatus according to the invention.

FIG. 8 is a block diagram of a liquid crystal display apparatus according to this embodiment. Referring to FIG. 8, the liquid crystal apparatus includes a liquid crystal display panel 110 as described above for image display, a scanning electrode driver 101, a data electrode driver 103, a drive control circuit 4 including a scanning signal control circuit 5, a data signal control circuit 6 and a drive voltage generation circuit 7, and a graphic controller 8 including a video RAM (VRAM) 9 for storing picture data.

In operation, data is transferred from the graphic controller including the VRAM 9 to the drive control circuit 4 according to transfer clock signals. The data is inputted to the scanning signal control circuit 5 and the data signal control circuit 6 and is converted into address data and display data, respectively, therein. According to the address data, scanning signal waveforms and data signal waveforms are outputted from the scanning electrode driver 101 and the data electrode driver 103. The respective levels of drive voltages are generated from the drive voltage generation circuit 7.

Figure 9:
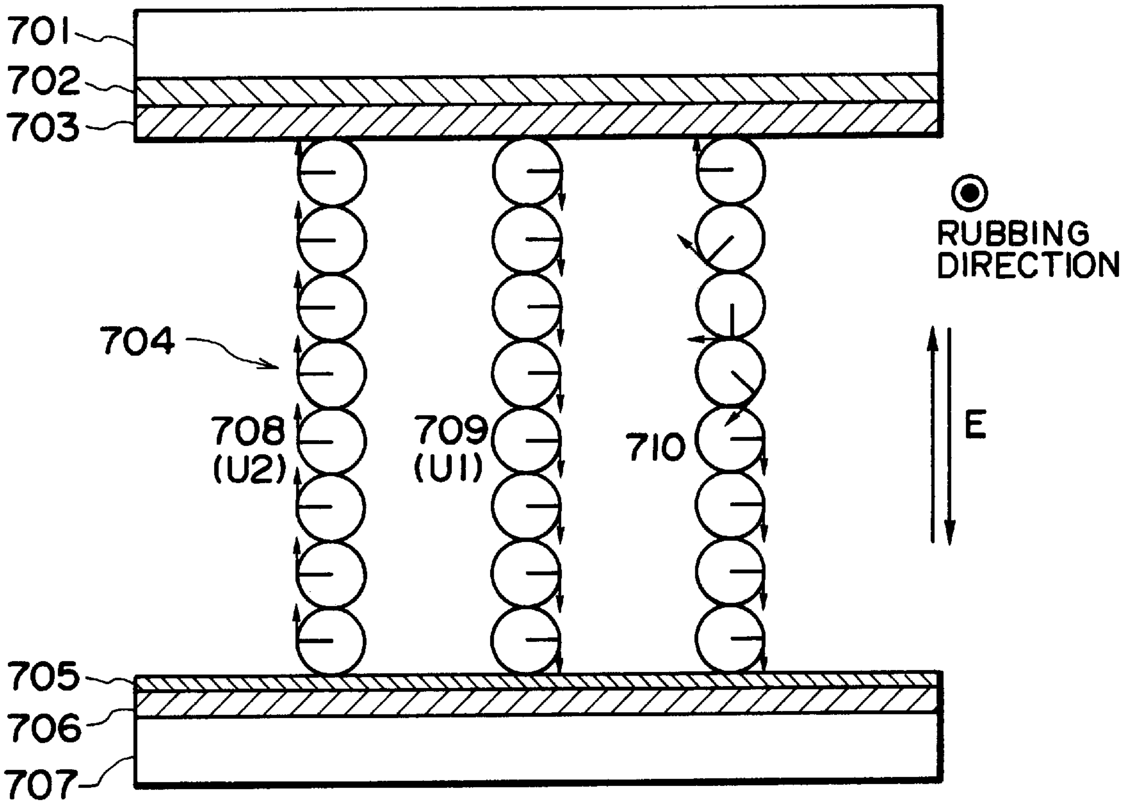
FIG. 9 is a schematic sectional view of a liquid crystal (device) used in the first embodiment of the liquid crystal apparatus for illustrating a cell structure and a liquid crystal alignment model.

The liquid crystal panel used in this embodiment has a cell structure including a pair of oppositely disposed substrates having mutually different surface properties as schematically illustrated in FIG. 9. Referring to FIG. 9, a liquid crystal cell (panel) includes a pair of glass substrates 701 and 707 having thereon transparent electrodes 702 and 706 respectively of ITO, etc. One substrate 701 is further coated with an alignment film 703 having a homogeneous alignment power as a result of a uniaxial aligning treatment, such as rubbing. The other substrate 707 is provided with a coating layer or surface 705 exhibiting a homeotropic alignment characteristic. Between the substrate 701 and 707, a ferroelectric liquid crystal layer 704 is disposed so as to form a uniform alignment state giving two stable states 708 (U1) and 709 (U2) each schematically represented by a succession of helical cones characterizing liquid crystal molecules in chiral smectic phase arranged vertically between the substrates. A remaining succession of cones 710 represents a splay alignment state which can occur at some minor regions in the cell.

In a specific example, a liquid crystal cell was prepared in the following manner. A pair of glass substrates each provided with transparent electrodes of 70 nm-thick ITO films formed by sputtering were provided. The ITO electrodes on one substrate were coated with a 1%-solution of polyamic acid (polyimide precursor) ("LP-64", available from Toray K.K.) in a solvent mixture of NMP (N-methylpyrrolidone): n-BC (n-butyl cellosolve) (=2:1) by spin coating at 45 rps (revolutions/sec) for 20 sec. Then, the coated substrate was subjected to solvent drying for 5 min. in an oven at 80° C. and then hot baking for 1 hour in an oven at 200° C. for imidization. The resultant polyimide film had a thickness of ca. 10 nm and subjected to rubbing with a nylon cloth wound about a 10 cm-dia. roller under the conditions of 16.7 rps, a cloth pressing depth against the film of 0.4 mm, a substrate feed speed of 10 mm/sec and two times of one way rubbing. Thereafter, a 0.008 wt. % dispersion of silica beads having an average diameter of 2.0 $\mu$m in IPA (isopropyl alcohol) was applied by spin coating at 25 rps for 10 sec on the polyimide alignment film to disperse the silica spacer beads at a density of ca. 300 particles/mm$^2$. The ITO electrodes on the other substrate were coated with a 0.5 wt. % solution in alcohol of silane coupling agent ("ODS-E") by spin coating at 45 rps for 20 sec., as a homeotropic aligning treatment. Then, a thermosetting sealant was applied at prescribed peripheral parts on the substrate.

The thus-treated two substrates were oppositely disposed and applied to each other, and subjected to thermosetting for 90 min. in an oven at 150° C. to form a blank cell. Then, the cell was filled with a liquid crystal material exhibiting in its chiral smectic phase a spontaneous polarization of 30 nC/cm$^2$ (at 25° C.), and a layer inclination angle δ of 0 deg. and a tilt angle of 22 deg., respectively at 20° C., after heating into its isotropic phase, followed by gradual cooling to room temperature and sealing-up of the injection port.

Thus, a liquid crystal cell (device) having 320×240 pixels was prepared.

The thus-prepared liquid crystal device was driven by applying drive waveforms described with reference to FIG. 4 for display "white" on the entire display (for measuring "threshold") and "black" on the entire display area (for measuring "crosstalk value). The voltage values used in the specific test (Example 1) were: Vs=8 volts and Vc=0 volt (in FIG. 4).

Figure 16:
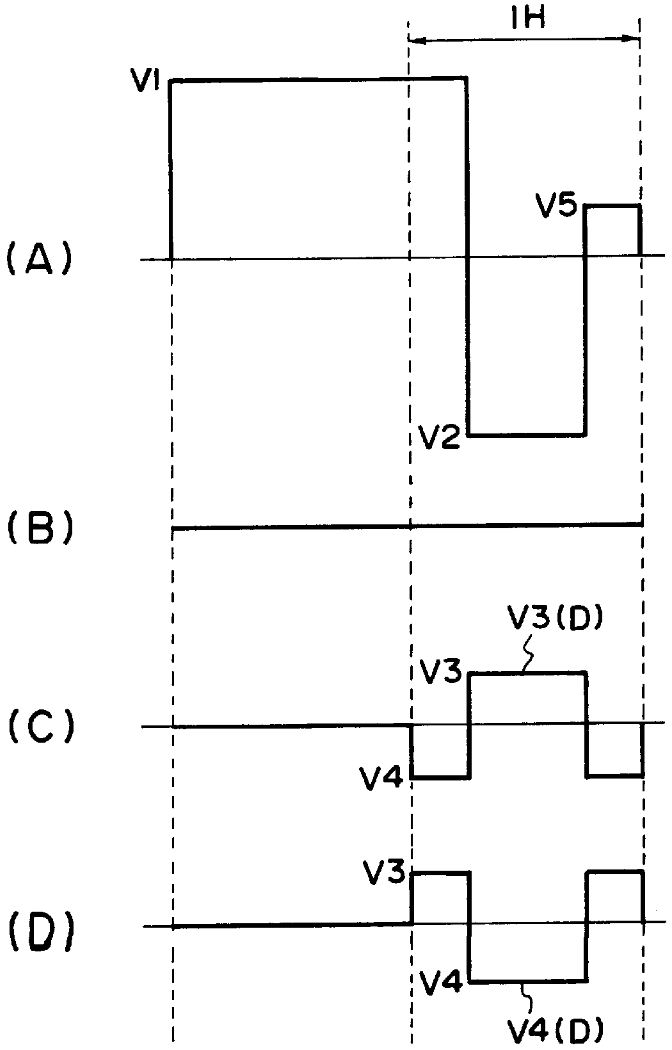
FIG. 16 illustrates a set of drive signals used in a conventional liquid crystal apparatus.

For comparison, the same device was driven by application of the conventional drive waveforms shown in FIG. 16, wherein V1=14 volts, V2=−14 volts, V3=+6 volts, T4=−6 volts and V5=7 volts.

The drive performances were evaluated by measuring, under constant voltage level conditions, a threshold (i.e., a minimum effective pulse width or one-line scanning period (Tn/2 in FIG. 3 or 4 or 1H in FIG. 6) required for causing stable switching into "white") and a crosstalk value (i.e., a maximum effective pulse width or one-line scanning period capable of retaining a "black" state over the entire pixels) to determine a drive margin according to the following formula:

drive margin=(crosstalk value−threshold)/(crosstalk value+threshold).

The measured values are summarized in the following Table.

TABLE 1

| | Drive margin | Threshold** |
|---|---|---|
| Comparative Example | 0.25 | 50 $\mu$s (= 1H) |
| Example 1 | 0.16 | 29 $\mu$s (= Tn/2) |

**For Example 1, a half of unit writing period Tn (= T1, T2 . . . , in FIG. 4) was taken as one-line scanning period because two scanning lines were driven simultaneously in the unit period Tn (= T1, T2, etc.).

In view of the results shown in Table 1, Example 1 resulted in a somewhat lower drive margin but succeeded in reducing the one-line scanning period (threshold) to nearly a half, thus allowing a remarkably higher-speed drive.

[Second Embodiment]

In this embodiment, data signals having waveforms different from those in the first embodiment are used.

Figure 10:
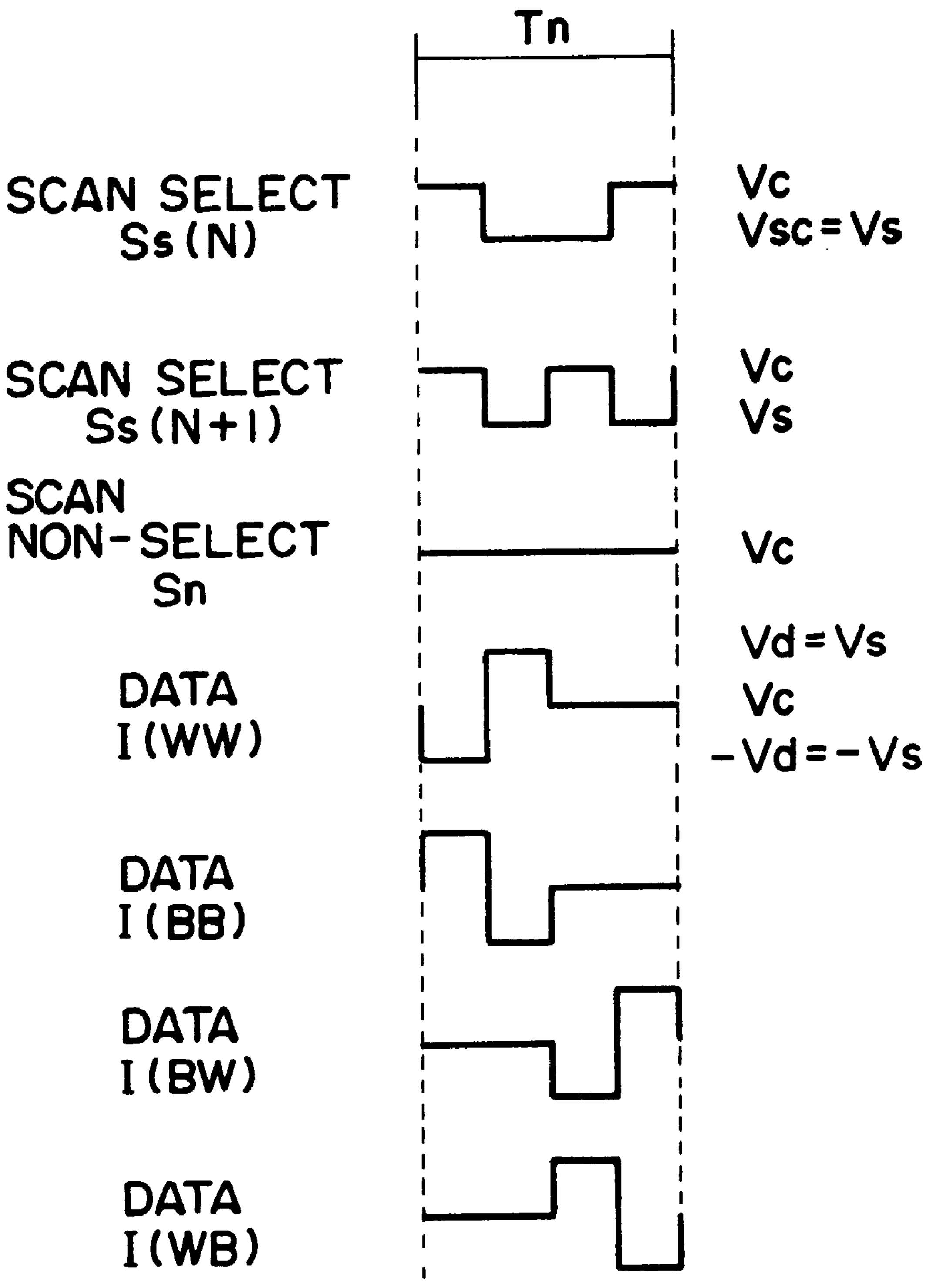
FIG. 10 illustrates a set of drive signals for a second embodiment of the invention.
Figure 11:
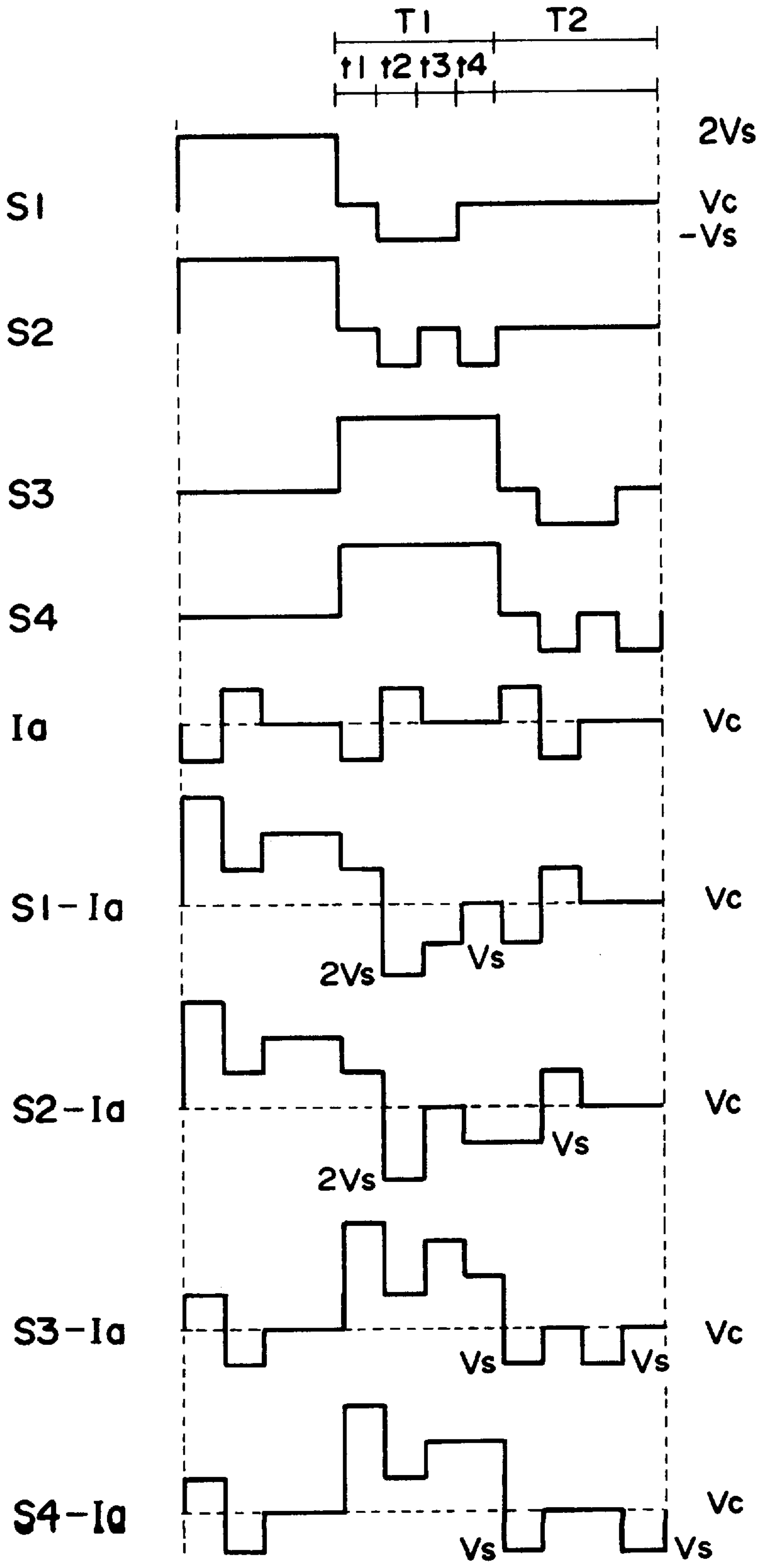
FIG. 11 illustrates a time-serial continuation of the drive signals.

FIGS. 10 and 11 show sets of drive waveforms used in this embodiment (corresponding to those shown in FIGS. 3 and 4 used in the first embodiment).

Referring to FIG. 10, Ss(N) represents a scanning selection signal applied to an N-th scanning electrode and Ss(N+1) represents a scanning selection signal applied to an N+1-th scanning electrode, respectively, addressed at an address period Tn (n=1, 2, . . . n), and Sn represents a scanning non-selection signal applied to scanning electrodes not addressed at the address period Tn.

On the other hand, I(WW), I(BB), I(BW) and I(WB) represent data signals selectively applied to data electrodes for displaying W(white)-W, B(black)-B, B-W and W-B, respectively, at two pixels on simultaneously selected two scanning electrodes. In this embodiment, the scanning signal voltage Vsc=Vs similarly as in the first embodiment, but the data signal voltage are set to satisfy Vd1=Vd=Vs and Vd2=Vc.

FIG. 11 is a time-serial voltage waveform showing a state where drive voltages shown in FIG. 10 are applied in succession to provide a display pattern shown in FIG. 5 at intersections (pixels) of scanning electrodes S1–S4 and a data electrode I1. Referring to FIG. 11, at an address period T1, a first scanning electrode S1 and a second scanning electrode S2 are simultaneously addressed by applying thereto scanning signals Ss(N) and Ss(N+1), respectively shown in FIG. 10. Further, at an address period T2, a third scanning electrode S3 and a fourth scanning electrode S4 are simultaneously addressed by applying thereto the scanning signals Ss(N) and Ss(N+1), respectively, shown in FIG. 10. Before each address period Tn, a reset pulse having a pulse width of period Tn−1 and a pulse voltage 2Vs is applied so as to provide a black display state as a reset state.

In this embodiment, pixels on scanning electrodes S1 and S2 intersecting with a data electrode Ia are respectively driven to display "white" and accordingly are supplied with a data signal I(WW) at an address period T1, and pixels on scanning electrodes S3 and S4 for respectively displaying "black" are supplied with a data signal I(BB) at an address period T2.

As a result, the respective intersections (pixels) are supplied with combined signals as shown at S1-Ia, S2-Ia, S3-Ia and S4-Ia, respectively. Corresponding thereto, in a selection period T1 for the scanning electrode S1 for "white" display, the pixel (S1-Ia) is supplied with 2Vs at phase t2 and Vs at phases t3, and in the selection period T1 for the scanning electrode S2, the pixel (S2-Ia) is supplied with 2Vs at phase t2, and Vs at phase t4. On the other hand, for "black" display, in a selection period T2 for the scanning electrode S3, the pixel (S3-Ia) is supplied with Vs at phase t1 and Vs at phase t3, and in the selection period T2 for the scanning electrode S4, the pixel (S4-Ia) is supplied with Vs at phase t1 and Vs at phase t4. Accordingly, a pixel in the "white" display-selection period is supplied with a time-integrated voltage of 2Vs+Vs=3Vs. On the other hand, a pixel in the "black" display-selection period is supplied with a time-integrated voltage of Vs+Vs=2Vs. Accordingly, if a threshold voltage Vth of the liquid crystal is set to satisfy: 2Vs<Vth<3Vs, the pixels can be selectively written into either "white" or "black" within their associated selection periods. Vs may be set within a range of 1–30 volts, and phases t1–t4 may respectively be set to have a duration of 1–50 μsec.

In this embodiment, the scanning signal voltage Vsc and data signal voltage Vd are set to Vsc=Vd=Vs, but it is also possible to adapt Vsc=2Vd, Vsc=3Vd, etc. It is generally preferred to adopt a range of Vd≦Vsc≦3Vd.

In this embodiment, a panel structure and a block diagram for the liquid crystal apparatus may be similar to those in the first embodiment.

A specific liquid crystal device prepared in the same manner as in the first embodiment was driven by applying drive waveforms shown in FIGS. 10 and 11 wherein Vs=10 volts and Vc=0 volt (Example 2). The drive performances were evaluated similarly as in the first embodiment with respect to drive margin and threshold (one-line scanning period). The results are shown in Table 2 below together with those of Comparative Example shown again for reference.

TABLE 2

| | Drive margin | Threshold |
|---|---|---|
| Comparative Example | 0.25 | 50 μs (= 1H) |
| Example 2 | 0.18 | 27 μs (= Tn/2) |

As shown in Table 2 above, according to this embodiment (Example 2), a somewhat better drive margin than Example 1 was attained, and the one-line scanning period was reduced to almost a half that of the conventional scheme.

[Third Embodiment]

In this embodiment, the second embodiment described above is modified with respect to the reset pulse, i.e., by using a drive waveform including additionally an auxiliary pulse so as to provide an increased drive margin.

A panel structure and a block diagram of liquid crystal apparatus similar to those in the first embodiment may be used.

Figure 12:
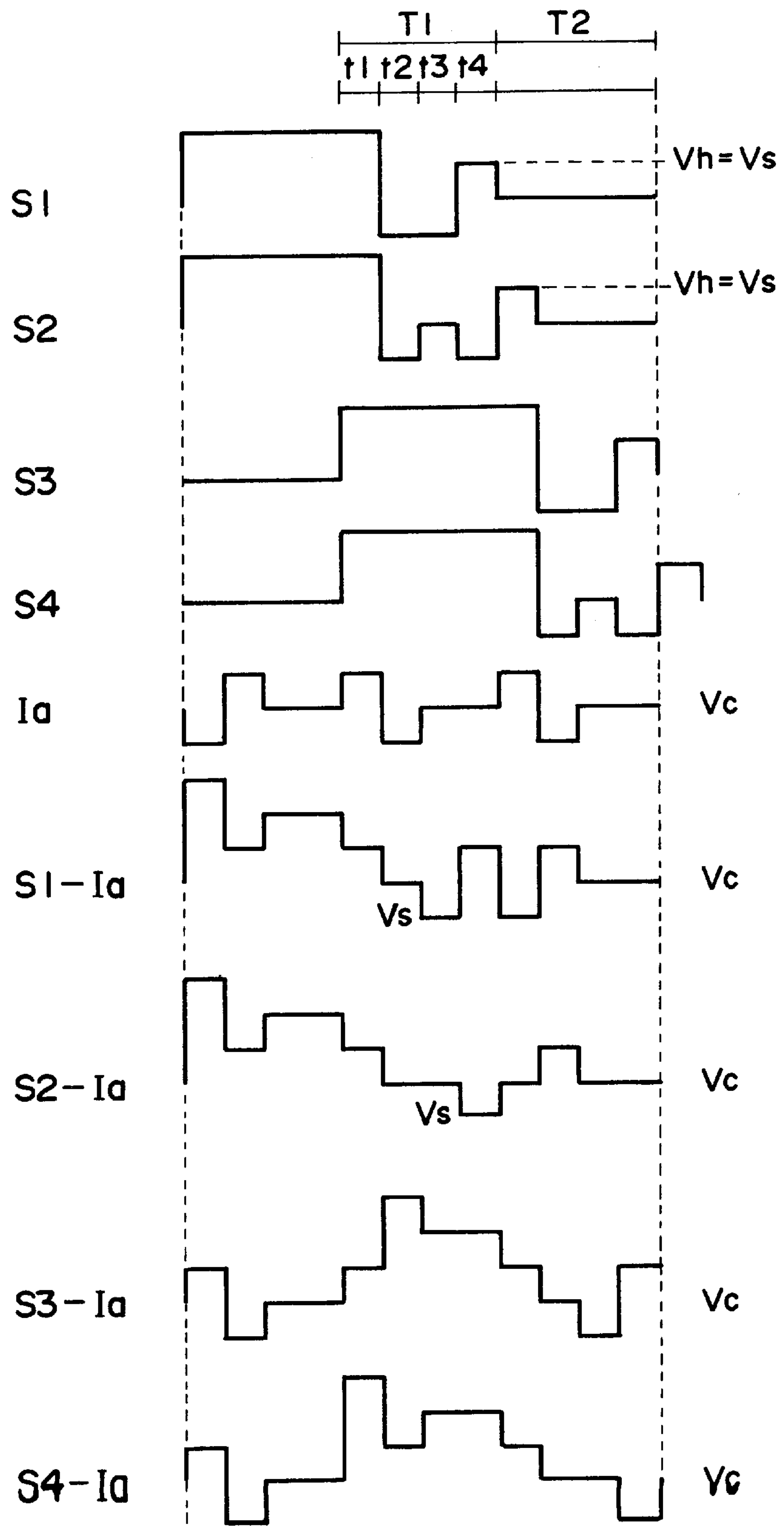
FIG. 12 illustrates a time-serial continuations of drive signals used in a third embodiment of the invention.
Figure 13:
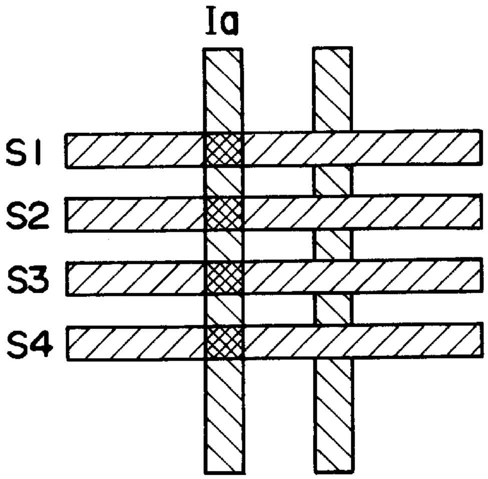
FIG. 13 illustrates a driven states of pixels according to the third embodiment.

FIG. 12 is a waveform diagram showing drive voltage waveforms time-serially applied in the third embodiment so as to provide a display state at intersections (pixels) of scanning electrodes S1–S4 and a data electrode Ia shown in FIG. 13. Referring to FIG. 12, at an address period T1, a first scanning electrode S1 and a second scanning electrode S2 are simultaneously addressed, and at an address period T2, a third scanning electrode S3 and a fourth scanning electrode S4 are simultaneously addressed. As is understood from waveforms at S1 and S2 in FIG. 12, compared with those for the second embodiment shown in FIG. 10, a reset pulse continues until phase t1 in the address period and an auxiliary pulse is inserted at a phase (phase t4 for a scanning electrode S(N), e.g., S1; phase t1 of a subsequent address period for a scanning electrode S(N+1), e.g., S2). Data signals have waveforms similar to those in the second embodiment. The auxiliary pulse may have a voltage Vh set to satisfy Vh=Vs.

In this embodiment, the pixels on the scanning electrodes S1–S4 are set to display "black", so that the data electrode Ia receives data signal I(BB) respectively at address periods T1 and T2. As a result, the combined waveforms applied to the pixels have waveforms shown at S1-Ia, S2-Ia, S3-Ia and S4-Ia, respectively.

According to such waveforms of this embodiment, Vs is applied at phase t3 in the selection period for the scanning electrode S1, and only Vs is applied at phase t4 in the selection period for the scanning electrode S2, respectively for displaying "black". In other words, a Vs pulse portion at phase t1 is cancelled by the reset pulse and, because of the auxiliary pulse, the influence of a data signal in the subsequent address period can be reduced, thus favoring "black" display and providing a broader drive margin.

A specific liquid crystal device prepared in the same manner as in the first embodiment was driven by applying drive waveforms shown in FIG. 12 wherein Vs=10 volts and Vc=0 volt (Example 3). The drive performances were evaluated similarly as in the first embodiment with respect to drive margin and threshold (one-line scanning period). The results are shown in Table 3 below together with those of Comparative Example shown again for reference.

TABLE 3

| | Drive margin | Threshold |
|---|---|---|
| Comparative Example | 0.25 | 50 μs (= 1H) |
| Example 3 | 0.22 | 29 μs (= Tn/2) |

As described above, a larger drive margin can be provided by modifying the reset pulse or auxiliary pulse.

[Fourth Embodiment]

In this embodiment, three scanning electrodes are driven simultaneously.

A panel structure and a block diagram of liquid crystal apparatus similar to those in the first embodiment may be used.

Figure 14A:
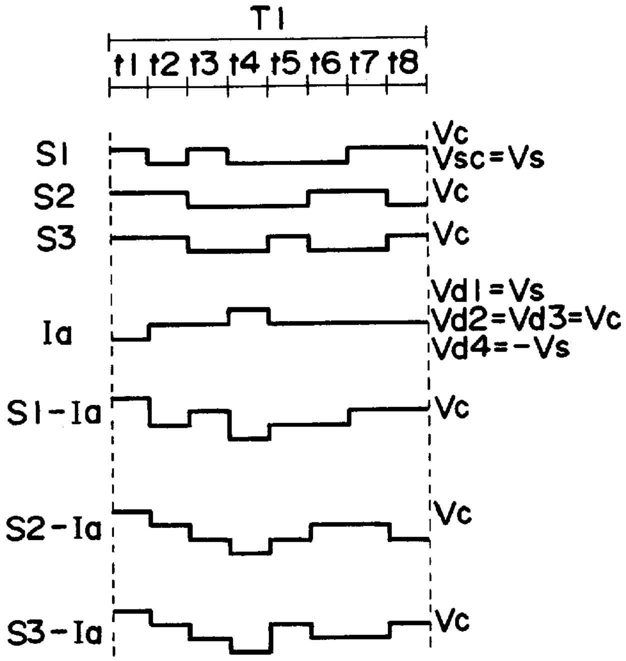
FIGS. 14A and 14B illustrate a time-serial continuation of drive signals used in a fourth embodiment of the invention.
Figure 14B:
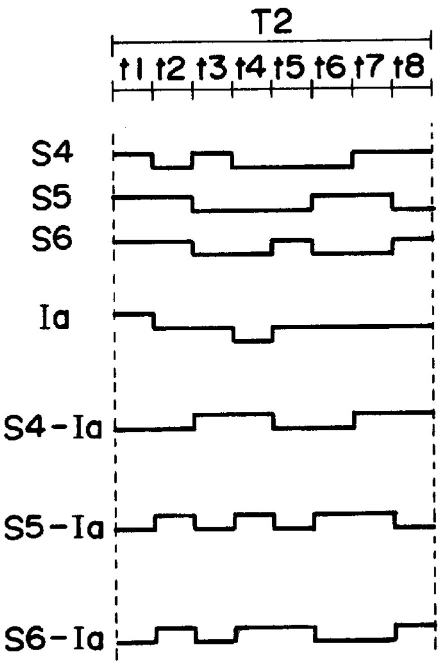
Figure 15:
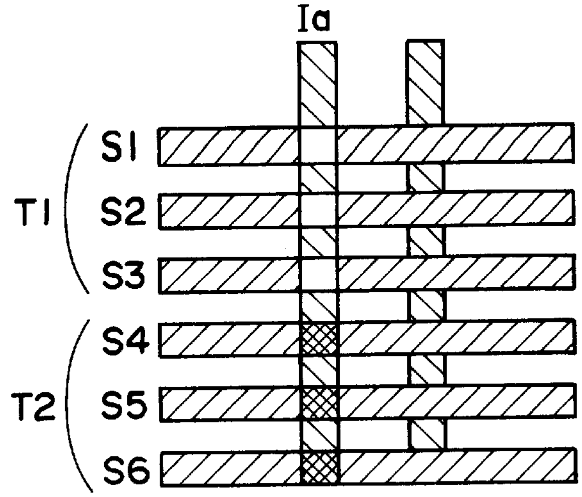
FIG. 15 illustrates a driven state of pixels according to the fourth embodiment.

FIGS. 14A and 14B are waveform diagrams showing drive voltage waveforms time-serially applied in the fourth embodiment so as to provide a display state at intersections (pixels) of scanning electrodes S1–S6 and a data electrode Ia shown in FIG. 15. Referring to FIGS. 14A and 14B, at an address period T1, scanning electrodes S1–S3 are simultaneously addressed, and at an address period T2, scanning electrodes S4–S6 are simultaneously addressed. The scanning signals are designed to include a selection pulse voltage Vsc=Vs, and the data signals are designed to have voltages Vd1=–Vd4=Vs and Vd2=Vd3=Vc.

In this embodiment, pixels at intersections with a data electrode Ia on scanning electrodes S1–S3 are respectively driven to display "white" so that the data electrode Ia is supplied with a data signal for displaying "white" and pixels at intersections with the data electrode Ia on scanning electrodes S4–S6 are respectively driven to display "black" so that the data electrode Ia is supplied with a data signal for displaying "black". As a result, the combined waveforms applied to the pixels have waveforms shown at S1-Ia, S2-Ia, S3-Ia, S4-Ia, S5-Ia and S6-Ia, respectively, in FIGS. 14A and 14B.

A specific liquid crystal device prepared in the same manner as in the first embodiment was driven by applying drive waveforms shown in FIGS. 14A and 14B wherein Vs=8 volts and Vc=0 volt (Example 4). The drive performances were evaluated similarly as in the first embodiment with respect to drive margin and threshold (one-line scanning period (=Tn/3 as 3 scanning lines were selected simultaneously)). The results are shown in Table 4 below together with those of Comparative Example shown again for reference.

TABLE 4

| | Drive margin | Threshold |
|---|---|---|
| Comparative Example | 0.25 | 50 $\mu s$ (= 1H) |
| Example 4 | 0.16 | 20 $\mu s$ (= Tn/3) |

As shown in Table 4, in this embodiment of three-line simultaneous drive, the drive margin was somewhat lowered, but the one-line scanning period was reduced to almost one third, thereby allowing a high-speed drive.

As has been described above, in the present invention, drive waveforms suitable for simultaneously driving a plurality of scanning lines are used to select a plurality (M) of scanning lines within a period comparable to a period for selecting one scanning line at a time, so that a high-speed drive can be realized and a larger picture area can be realized without causing a lowering in picture quality.

Further, by effectively utilizing a reset pulse, unnecessary pulses can be cancelled to provide an increased drive margin.

Further, by adding an auxiliary pulse after a writing pulse, the writing pulse at the time of half-selection can be reduced to provide a larger drive margin.

A further increased drive margin can be attained by using a liquid crystal having a drive characteristic suitable for the present invention.

What is claimed is:

1. A liquid crystal apparatus, comprising:

(A) a liquid crystal device comprising a group of scanning electrodes, a group of data electrodes intersecting the scanning electrodes, and a liquid crystal disposed so as to form a matrix of pixels each at an intersection of the scanning electrodes and the data electrodes, said liquid crystal having at least two stable states so as to be written into one stable state when supplied with a voltage of one polarity exceeding a threshold, and (B) drive means for driving the liquid crystal device by selectively applying scanning signals and data signals to the scanning electrodes and the data electrodes so as to selectively apply a combined voltage to each pixel; said drive means comprising means for:

simultaneously selecting M scanning electrodes (M being an integer of at least 2), and applying scanning signals to the simultaneously selected scanning electrodes and data signals to the data electrodes so as to apply writing pulses for determining states of pixels to pixels at the intersections of the selected scanning electrodes and the data electrodes and so that each pixel on the selected scanning electrodes is supplied with writing pulse(s) of a writing polarity having a time-integrated voltage value which is larger than that of writing pulse(s) of an anti-writing polarity, if any, wherein each scanning signal includes a selection period composed of $2^M$ phases; the M scanning electrodes selected simultaneously receive scanning signals having mutually different voltage patterns in the selection period, each composed of a various combination of a phase having a selection pulse for determining a pixel state denoted by a voltage pattern digit "1" and a phase having no selection pulse denoted by a voltage pattern digit "0"; each data signal is selected from $2^M$ voltage patterns based on display data for associated M pixels on the selected scanning electrodes so as to provide a various combination of a written pixel state denoted by a display pattern digit "1" and a non-written pixel state denoted by a display pattern digit "0", so that each data signal is set to have voltage levels for the respective phases which are determined depending on the decree of coincidence between the voltage pattern digit and the display pattern digit at the respective phases, and wherein the voltage level of each phase of a data signal is set to have a highest voltage V1 of a writing polarity when the voltage pattern digits for the M scanning electrodes fully coincide with the display pattern digits for the M pixels, a highest voltage V2 of an anti-writing polarity when the voltage pattern digits for the M scanning electrodes do not coincide at all with the display pattern digit for the M pixels, and a medium voltage Vn when the voltage Pattern digits partly coincide with the display pattern digits, Vn being determined depending on the degree of the coincidence.

2. A liquid crystal apparatus according to claim 1, wherein each scanning signal includes a plurality of selection pulses for determining a pixel state, said plurality of selection pulses all having a writing polarity.

3. A liquid crystal apparatus according to claim 1, wherein each scanning signal includes a reset pulse.

4. A liquid crystal apparatus according to claim 1, wherein the medium voltage Vn is uniformly set to be zero, and the voltage V1 and V2 are determined to satisfy V1=−V2.

5. A liquid crystal apparatus according to claim 1, wherein each scanning signal includes a reset pulse in addition to the voltage pattern in the $2^M$ phases.

6. A liquid crystal apparatus according to claim 5, wherein each scanning signal includes a phase having a pulse which has a voltage level and a voltage polarity which are equal to those of the reset pulse.

7. A liquid crystal apparatus according to claim 6, wherein the pulse having a voltage level and a voltage polarity equal to those of the reset pulse forms a portion of each of the M scanning signals for the M scanning electrodes at a phase where none of the selected pixels are written.

8. A liquid crystal apparatus according to claim 1, wherein each scanning signal further includes an auxiliary pulse having a polarity different from that of a selection pulse immediately after the selection pulse.

9. A liquid crystal apparatus according to claim 1, wherein M is 2.

10. A liquid crystal apparatus according to claim 1, wherein M is 3.

11. A liquid crystal apparatus according to claim 1, wherein the scanning signals and the data signals are determined so as to provide a bias ratio of 2-4 in terms of a ratio between the level of the combined voltage applied to a pixel in its selection period and the level of the data signals applied to a pixel in a non-selection period.

12. A liquid crystal apparatus according to claim 1, wherein said liquid crystal has a threshold characteristic represented by a formula of $$|\log_{10}\Delta t1-\log_{10}\Delta t2|/\log_{10}V1-\log_{10}V2|>1,$$

wherein V1 and V2 denote threshold voltage of the liquid crystal at voltage application periods of Δt1 and Δt2, respectively.

13. A liquid crystal apparatus according to claim 1, wherein the liquid crystal is a liquid crystal exhibiting chiral smectic phase.

14. A liquid crystal apparatus, comprising:

(A) a liquid crystal device comprising a group of scanning electrodes, a group of data electrodes intersecting the scanning electrodes, and a liquid crystal disposed so as to form a matrix of pixels each at an intersection of the scanning electrodes and the data electrodes, said liquid crystal having at least two stable states so as to be written into one stable state when supplied with a voltage of one polarity exceeding a threshold, and (B) drive means for driving the liquid crystal device by selectively applying scanning signals and data signals to the scanning electrodes and the data electrodes so as to selectively apply a combined voltage to each pixel; said drive means comprising means for:

simultaneously selecting M scanning electrodes (M being an integer of at least 2), and applying scanning signals to the simultaneously selected scanning electrodes and data signals to the data electrodes so as to apply writing pulses for determining states of pixels to pixels at the intersections of the selected scanning electrodes and the data electrodes and so that each pixel on the selected scanning electrodes is supplied with writing pulse(s) of a writing polarity having a time-integrated voltage value which is larger than that of writing pulse(s) of an anti-writing polarity, if any, wherein the scanning signals and the data signals are determined so as to provide a bias ratio of 2-4 in terms of a ratio between the level of the combined voltage applied to a pixel in its selection period and the level of the data signals applied to a pixel in a non-selection period.

15. A liquid crystal apparatus, comprising:

(A) a liquid crystal device comprising a group of scanning electrodes, a group of data electrodes intersecting the scanning electrodes, and a liquid crystal disposed so as to form a matrix of pixels each at an intersection of the scanning electrodes and the data electrodes, said liquid crystal having at least two stable states so as to be written into one stable state when supplied with a voltage of one polarity exceeding a threshold, and (B) drive means for driving the liquid crystal device by selectively applying scanning signals and data signals to the scanning electrodes and the data electrodes so as to selectively apply a combined voltage to each pixel; said drive means comprising means for:

simultaneously selecting M scanning electrodes (M being an integer of at least 2), and applying scanning signals to the simultaneously selected scanning electrodes and data signals to the data electrodes so as to apply writing pulses for determining states of pixels to pixels at the intersections of the selected scanning electrodes and the data electrodes and so that each pixel on the selected scanning electrodes is supplied with writing pulse(s) of a writing polarity having a time-integrated voltage value which is larger than that of writing pulse(s) of an anti-writing polarity, if any, wherein said liquid crystal has a threshold characteristic represented by a formula of $$|\log_{10}\Delta t1-\log_{10}\Delta t2|/|\log_{10}V1-\log_{10}V2|>1,$$

wherein V1 and V2 denote threshold voltage of the liquid crystal at voltage application periods of Δt1 and, Δt2, respectively.

* * * * *

UNITED STATES PATENT AND TRADEMARK OFFICE

CERTIFICATE OF CORRECTION

PATENT NO. : 6,222,517 B1
DATED : April 24, 2001
INVENTOR(S) : Jun Iba et al.

It is certified that error appears in the above-identified patent and that said Letters Patent is hereby corrected as shown below:

Column 7,
Line 32, “applied-so” should read -- applied so --.

Column 14,
Line 23, “decree” should read -- degree --; and
Line 33, “Pattern” should read -- pattern --.

Signed and Sealed this

Tenth Day of June, 2003

JAMES E. ROGAN
*Director of the United States Patent and Trademark Office*